United States Patent [19]

Lupattelli et al.

[11] 4,013,843
[45] Mar. 22, 1977

[54] MARKER FOR EXTENDING CALLS TO REMOTE JUNCTIONS IN A TELECOMMUNICATIONS SYSTEM

[75] Inventors: Carlo Lupattelli; Alfredo Miotti, both of Milan, Italy

[73] Assignee: Societa Italiana Telecomunicazioni Siemens S.p.A., Milan, Italy

[22] Filed: Oct. 29, 1975

[21] Appl. No.: 626,875

[30] Foreign Application Priority Data

Oct. 29, 1974 Italy .................. 28898/74

[52] U.S. Cl. .................................. 179/18 EB
[51] Int. Cl.² .................................. H04Q 1/30
[58] Field of Search ........ 179/18 EB, 18 D, 18 DA, 179/18 E, 18 AD, 90 BB

[56] References Cited

UNITED STATES PATENTS

| | | | |
|---|---|---|---|
| 3,316,355 | 4/1967 | Hanna et al. ............. | 179/18 EB |
| 3,671,677 | 6/1972 | Lee, Jr. et al. ............ | 179/18 DA |
| 3,736,383 | 5/1973 | Le Baron ................ | 179/18 HA |
| 3,931,476 | 1/1976 | Matthews ............... | 179/18 AD |

*Primary Examiner*—Thomas W. Brown
*Attorney, Agent, or Firm*—Karl F. Ross; Herbert Dubno

[57] ABSTRACT

A marker designed to control a switching circuit for extending an outgoing call to a remote junction, identified by a characteristic digit or digit combination at the beginning of a call number emitted by a local subscriber, includes a first and a second memory connected in tandem via an intervening decoder, the first memory having respective cells addressable by all possible digits and digit combinations forming part of the characteristic call-number portion. The code words stored in these cells are translated by the decoder into (a) a signal ni indicating a nonexisting junction, (b) a signal ci denoting an incomplete characteristic, or (c) a signal if addressing a cell of the second memory to select a transmission path leading to a fully identified junction. The signal ci, when generated, is fed back to a translator in the input of the first memory together with the code word stored in the cell last addressed therein, this code word being then added to the next digit arriving at the translator whereby another cell in that memory is identified, and so on until a complete characteristic is received.

8 Claims, 4 Drawing Figures

MARKER FOR EXTENDING CALLS TO REMOTE JUNCTIONS IN A TELECOMMUNICATIONS SYSTEM

FIELD OF THE INVENTION

Our present invention relates to a marker for a telephone or other telecommunication system wherein a multiplicity of lines from local subscribers or possibly from more distant locations, adapted to initiate outgoing calls to destinations identified by multidigit call numbers, are temporarily connectable to transmission paths leading to remote junctions from which the calls may be further extended. The temporary connection is established by switch means under the control of the marker in response to the first digit or digits of a call number arriving over a line to which the marker has been assigned for that particular call.

BACKGROUND OF THE INVENTION

The use of such temporarily assignable markers is well known per se. Reference in this connection may be made, for example, to U.S. Pat. Nos. 3,328,534 and 3,524,934. In these conventional systems, especially in those operating electronically rather than electromechanically, it is generally necessary to store several or possibly all of the digits making up a call number before the marker is summoned. Such call numbers usually include upwards of seven digits, depending on whether local, intercity or international communications are involved. This deferred engagement of the marker delays the establishment of a connection to the desired remote junction from which the call is to be extended to the desired party.

OBJECT OF THE INVENTION

An important object of our invention, therefore, is to provide means in an electronically operating telecommunication system for speeding up the establishment of a connection between a calling line and a remote junction, especially in long-distance dialing, and for shortening the time during which the services of a marker are required for this purpose.

The junction-identifying initial part of a call number, which may be referred to as its characteristic portion, may include one or more digits according to the nature of the communication sought to be established. Some digits or digit combinations are never used in this characteristic portion and can therefore be recognized as errors; others, e.g. the digits "20" or "31" in the United States, are recognizable as fragments of a characteristic portion requiring one or more additional digits to complete the identification of the junction. Thus, another object of our invention is to provide an improved marker capable of distinguishing between complete, incomplete and erroneous junction identifications in a characteristic portion of a call number.

SUMMARY OF THE INVENTION

In accordance with our present invention, a marker for the control of the aforementioned switch means co-operates with a register designed to store at least the characteristic portion of a call number upon being engaged by a calling line, this marker including a first memory connected to the register and a second memory addressable from this first memory via a decoder in order to read out operating instructions for a circuit controlling the operation of the switch means. The first memory is provided with a first multiplicity of cells addressable by respective digits and digit combinations stored in the register, each of these first cells containing a code word falling into one of several categories. The first of these categories encompasses the contents of cells addressed by digits or digit combinations completely identifying a remote junction; a second category encompasses the contents of cells addressed by digits or digit combinations with incomplete junction identifications. Advantageously, there is also a third category for the contents of cells addressed by digits or digit combinations identifying nonexisting junctions. Code words in the first category result in the energization of a first decoder output by an identification signal which addresses one of a second multiplicity of cells in the second memory, according to the characteristic portion received by the first memory. A code word in the second category energizes a second decoder output to generate a request signal which is fed back to the register for calling forth a further digit. A third decoder output may be energized by a code word in the third category to emit a busy signal.

BRIEF DESCRIPTION OF THE DRAWING

The above and other features of our invention will now be described in detail with reference to the accompanying drawing in which.

SPECIFIC DESCRIPTION

Figure 4:
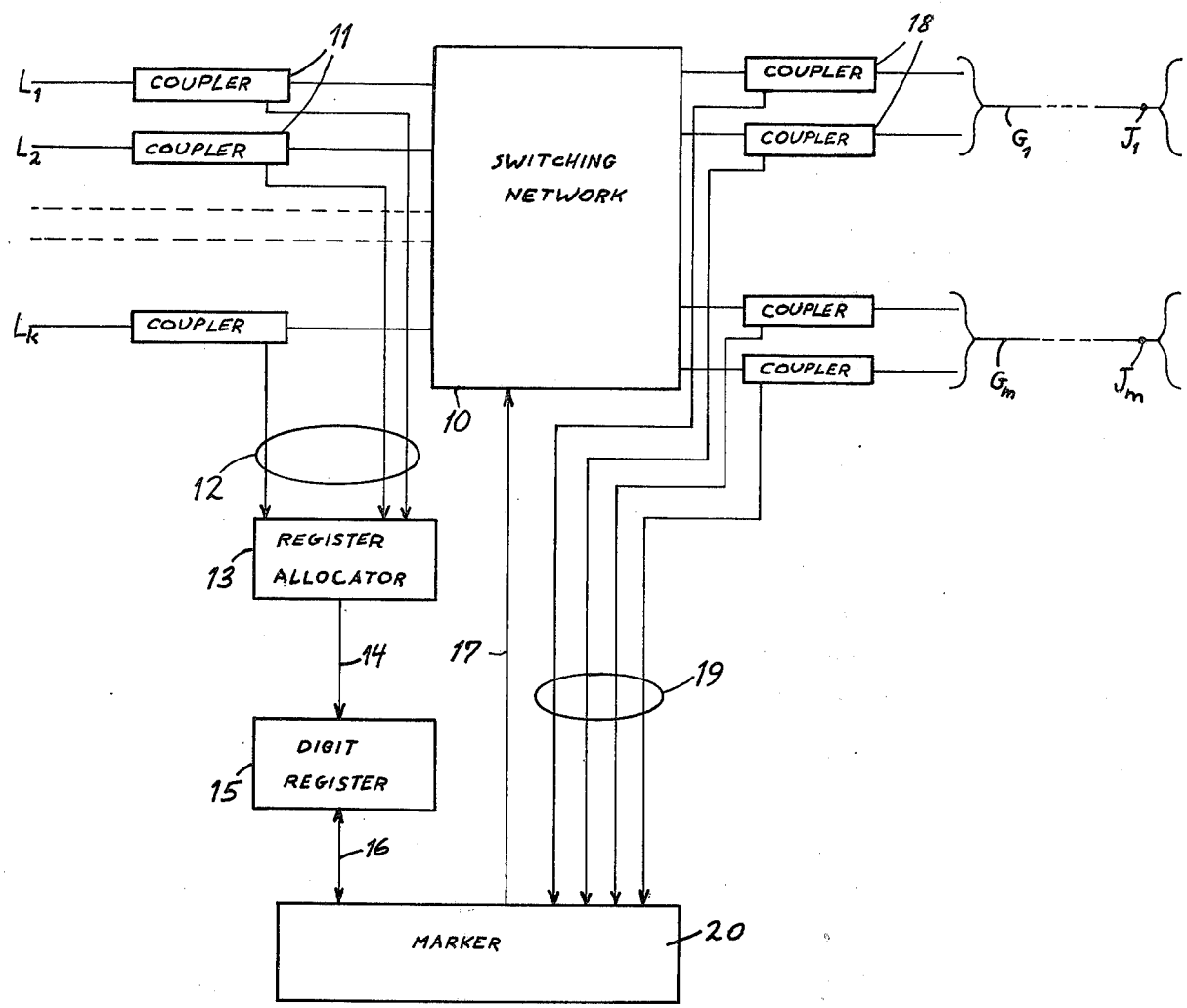
FIG. 4 is a diagram of part of a central office in a telecommunication system equipped with a register and a marker as shown in FIG. 1.

We shall first refer to FIG. 4 showing part of a telephone exchange with local lines $L_1, L_2, \ldots L_k$ (referred to hereinafter as subscriber lines) terminating at a switching network or line concentrator 10 from which an outgoing call may be extended to a lesser number of remote junctions $J_1 \ldots J_m$ via respective groups of transmission paths $G_1 \ldots G_m$ (referred to hereinafter as channels). Each group may include a number of direct trunks and certain circuitous routes. It should be understood that these channels need not have separate physical existences but could be represented by different carrier frequencies, especially within a given group. Naturally, the same network 10 also operates as a line distributor in the case of incoming calls originating at lines associated with junctions $J_1 - J_m$ and destined for subscriber lines $L_1 - L_k$.

Each subscriber line $L_1 - L_k$ includes a coupler 11 which, in the usual manner, monitors its activity and summons a digit register 15 via an allocator 13 and a lead 14 upon the initiation of a call by a local subscriber. The register 15 receives and stores the digits dialed by the subscriber, or at least those constituting the characteristic portion of a call number identifying one of the junctions $J_1 - J_m$. A particularly advantageous register construction has been described in our copending application Ser. No. 626,876 of even date whose disclosure is hereby incorporated by reference into the present description.

Register 15 is connected via a two-way link 16 with a marker 20 more fully described hereinafter with reference to FIGS. 1–3. The marker controls the operation of switching network 10 via a lead 17 and communicates by way of leads 19 with a set of couplers 18 inserted in the respective channels for the purpose of determining their availability. If a call is to pass through, say, junction $J_1$ and the first channel of group $G_1$ is not available, the marker tests the second channel of the group and so on until an idle channel is found; if none exists, a busy signal is sent to the calling subscriber in the conventional manner, via the corresponding coupler 11 and over circuits not further illustrated.

Figure 1:
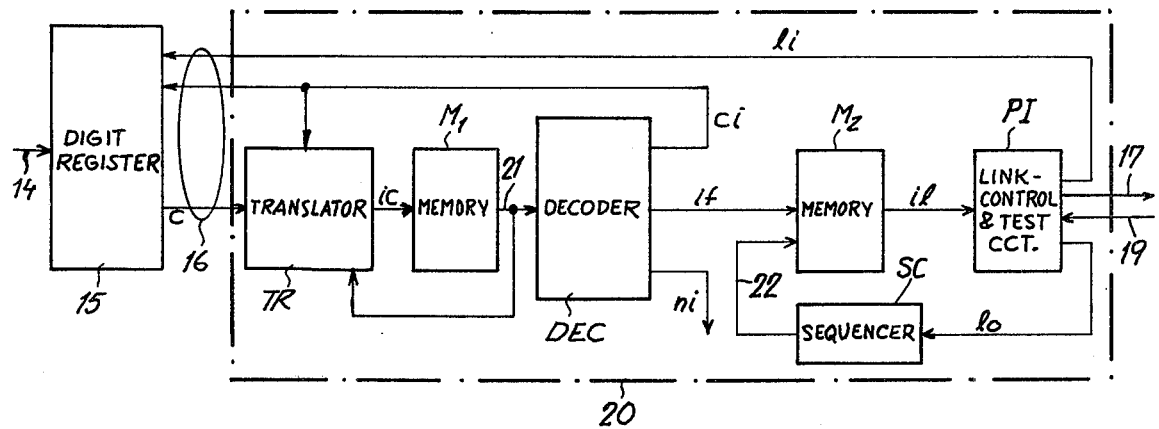
FIG. 1 is a block diagram showing a digit register together with a marker embodying our invention.

FIG. 1 shows details of marker 20 whose connections with register 15, encompassed within link 16, include a multiple $c$ for the feeding of stored digits to a translator TR within the marker, a lead $ci$ for feeding back a request signal to the register, and a lead $li$ carrying an availability signal as soon as a free outgoing channel has been found and seized in the group extending to the selected junction. Translator TR works via a connection $ic$ into a first memory $M_1$ with a number of cells corresponding to all the possible digits and digital combinations making up a characteristic portion of a call number. The contents of these cells are divided into three categories of code words which, upon being fed to a decoder DEC via a connection 21, energize one of three outputs $if$, $ci$ and $ni$ thereof. Output $if$, when energized, carries a junction-identifying signal to a second memory $M_2$, thereby addressing one of the cells thereof in accordance with the code word in the first category read out from one of the cells of memory $M_1$. Output $ci$, already referred to above, carries the aforementioned request signal in response to a code word in the second category, namely on reception of one or more digits from register 15 which constitute less than a complete characteristic portion. Output $ni$, energized by a code word in the third category read out from a cell of memory $M_1$ in response to a digit or digits incompatible with a characteristic portion identifying an existing junction, emits a busy signal by way of the corresponding coupler 11 (FIG. 4) to the calling subscriber.

Whenever an identification signal on decoder output $if$ addresses one of the cells of memory $M_2$, the contents of that cell are read out over a multiple $il$ to a link-control and test circuit PI which, via conductors 17 and 19, determines whether the first channel of a group serving the selected junction is available. If this is the case, circuit PI energizes the lead $li$ which directs the transmission of the remaining digits stored in register 15 to the selected channel over a signal path not shown in the drawing but fully described and illustrated in the co-pending application referred to. If, on the other hand, the initially chosen channel is already busy, an output lead $lo$ of circuit PI triggers a sequencer SC which then energizes a lead 22 extending back to memory $M_2$. Lead 22 carries a signal which supplements the identifying signal on output $if$ to address an adjacent cell in that memory, within a set of such cells assigned to the channels of a corresponding group, in order to test the next channel of that group for its availability. If that channel is also busy, sequencer SC increments the signal on its output lead 22 to address a third cell of the set, and so forth until an idle channel is found, causing energization of lead $li$, or the last channel has been explored and found busy, with resulting energization of lead $lo$.

Figure 2:
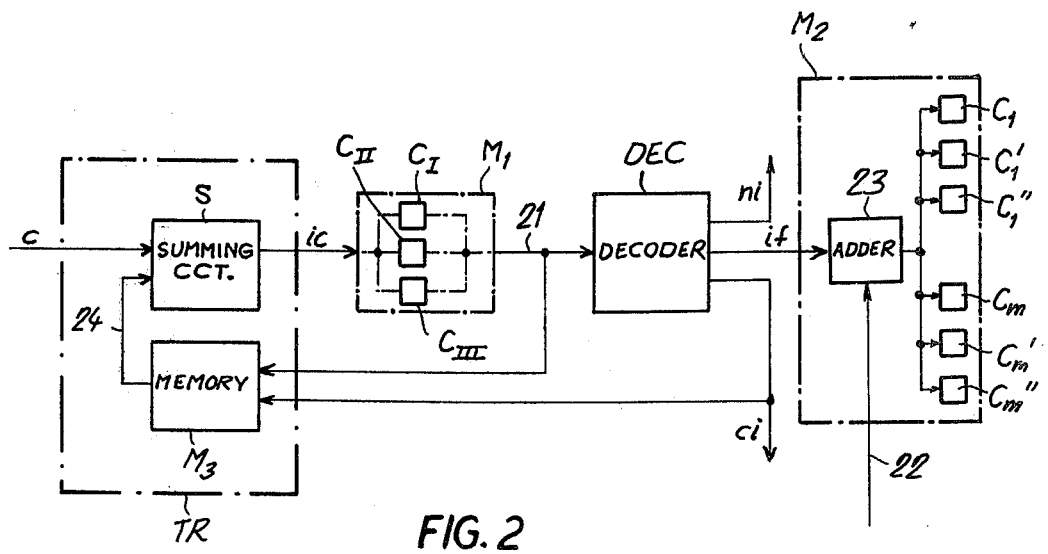
FIG. 2 is a more detailed diagram of part of the marker shown in FIG. 1.

The operation just described can be carried out with a conventional logical adder 23, illustrated in FIG. 2 which also shows several cells $C_1$, $C_1'$, $C_1''$ in memory $M_2$ associated with channel group $G_1$ and cells $C_m$, $C_m'$ and $C_m''$ associated with channel group $G_m$. FIG. 2 further shows cells $C_I$, $C_{II}$ and $C_{III}$ in memory $M_1$ representative of the three above-discussed categories.

In FIG. 2 we have illustrated a summing circuit S and a third memory $M_3$ forming part of translator TR. Outputs 21 and $ci$ of memory $M_1$ and decoder DEC have branches extending to memory $M_3$, the request signal on lead $ci$ enabling that memory to store the code word read out from a cell $C_{II}$ of memory $M_1$ until the next digit arrives over input $c$ from register 15. Summing circuit S, linked with memory $M_3$ by a connection 24, increments the numerical value of the new digit by a value assigned to the code word read into the memory $M_3$ from memory $M_1$. The incremented digit, upon being read out to memory $M_1$ via lead $ic$, addresses another cell in that memory which may be a cell $C_I$ in the first category resulting in an energization of the decoder output $if$. If, on the other hand, the characteristic portion fed to the marker from register 15 is still incomplete, the decoder output $ci$ is again energized so that memory $M_3$ will now store the contents of the cell last addressed in memory $M_1$ until a further digit comes in from the register 15.

Let us assume, by way of example, that the selected junction is identified by the area code 317. The first digit 3, dialed into register 15 and read out via summing circuit S to memory $M_1$, addresses cell No. 3 in that memory whose content is a code word of numerical value 21 as indicated in the table below. That numerical value, in a manner described hereinafter with reference to FIG. 3, energizes the lead $ci$ whereby the same value 21 is entered in memory $M_3$. Upon reception of the next digit 1 from register 15, summing circuit S increments this digit by the stored value 21 so that cell No. 22 is next addressed in memory $M_1$. That cell contains a code word of numerical value 81 which, upon storage in memory $M_3$, increments the third digit 7 to provide a new address, i.e., that of cell No. 88 which is in the first category and contains an identification code for the selected junction.

TABLE

| Characteristic Portion | Cell No. | Cell Contents | Binary Equivalent |
|---|---|---|---|
| 3 | 3 | 21 | 0010101 |
| 31 | 22 | 81 | 1010001 |
| 317 | 88 | 64 | 1000000 |

From the foregoing table it will be noted that the last bit of a code word fed into decoder DEC is a 1 if the junction identification is incomplete and is a 0 if it is complete; thus, the junction-identifying signals are all even numbers. In each of these instances, the code words read out from memory $M_1$ include one or more unit bits 1 in positions other than the last. An error code, indicative of a nonexisting junction, has the form 0000001, i.e., a unity bit in the last position and zero bits in all others. Naturally, the total number of bits may be different from that given here by way of example.

Figure 3:
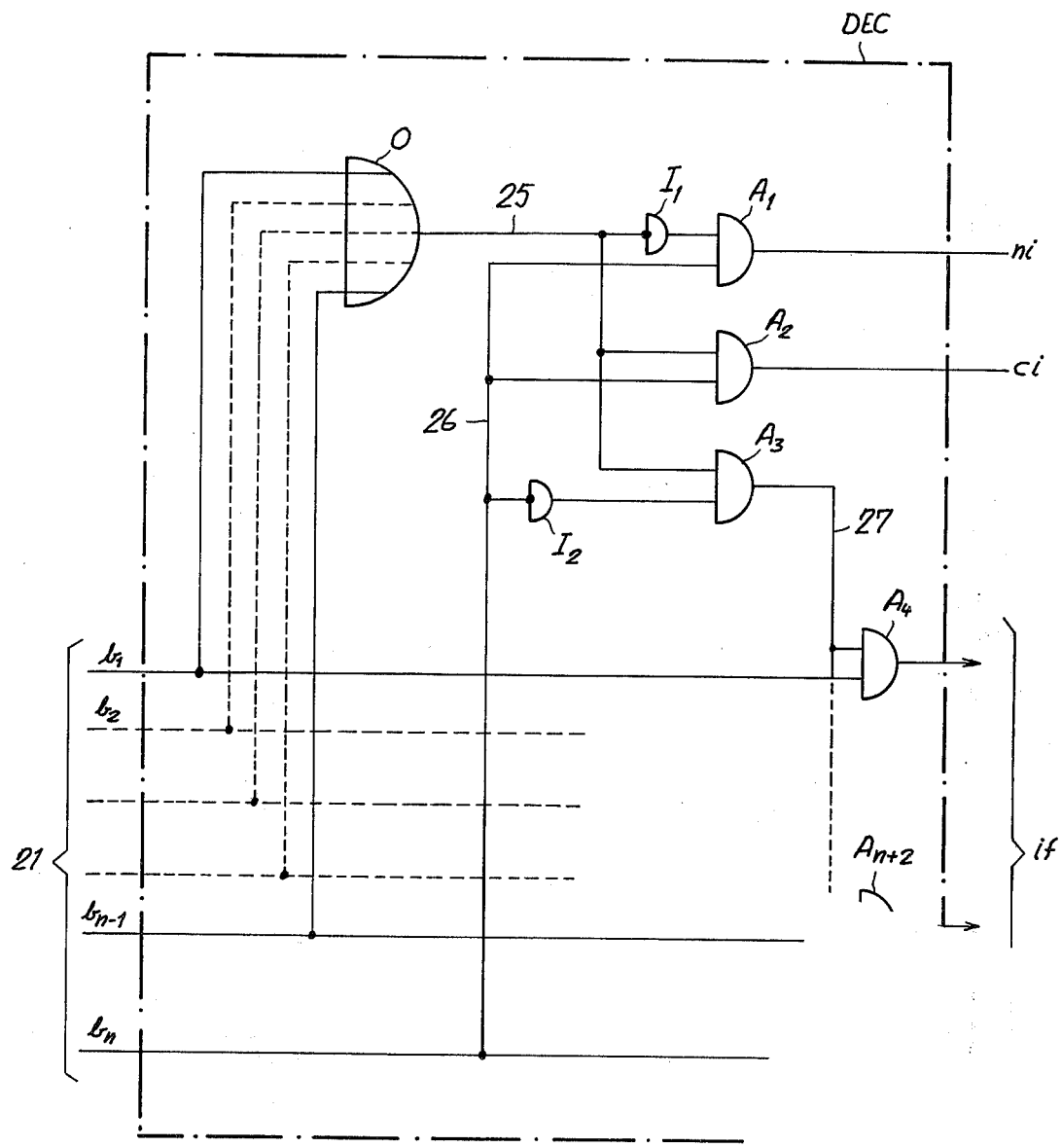
FIG. 3 is a circuit diagram of a decoder included in the marker.

In FIG. 3 we show the decoder DEC as comprising a logic network with input leads $b_1, b_2, \ldots b_{n-1}, b_n$ for the several bits of an n-bit code word read out from memory $M_1$, these leads forming part of the connection 21. Instead of being fed in parallel to the decoder, the several bits could also be delivered serially and then distributed within the decoder itself with the aid of a shift register as is well known per se. The first (n-1) leads $b - b_{n-1}$ are connected to respective inputs of an OR gate 0 having an output lead 25 with branches terminating at three AND gates $A_1$, $A_2$ and $A_3$, with interposition of an inverter $I_1$ in the case of gate $A_1$. Another input of each of these AND gates is connected to a branch 26 of input lead $b_n$, with interposition of an inverter $I_2$ in the case of gate $A_3$. The outputs of gates $A_1$ and $A_2$ are the leads $ni$ and $ci$, respectively. Gate $A_3$ has an output lead 27 connected to respective inputs of $n$ further AND gates $A_4, \ldots A_{n+2}, A_{n+3}$; gates $A_4 - A_{n+3}$ have their other inputs connected to leads $b_1 - b_n$, respectively.

If any of the first (n-1) bit positions of an incoming code word contains a unity bit 1, OR gate 0 conducts and energizes its output lead 25, thereby blocking the AND gate $A_1$. If the last bit on lead $b_n$ has the value 1, gate $A_2$ conducts and generates the request signal on lead $ci$. If that last bit is 0, gate $A_3$ is rendered conductive by way of inverter $I_2$ and energizes the lead 27 whereby the bit or bits appearing on leads $b_1 - b_n$ are transmitted via the respective AND gates $A_4 - A_{n+3}$ to the multiple $if$ leading to the memory $M_2$ of FIG. 1.

If only the input lead $b_n$ is energized, i.e., if an error code is read out from memory $M_1$, AND gate $A_1$ is made conductive through inverter $I_1$ and the busy signal is sent out on lead $ni$.

Naturally, the discriminating bit appearing on lead $b_n$ in the described arrangement could be placed in some other position within the code. The leads within multiple 21 connected to memory $M_3$ (FIG. 2) need not be the same as those extended to the decoder DEC and illustrated at $b_1 - b_n$ in FIG. 3.

The invention herein disclosed and claimed is also applicable to systems in which the register 15 stores only some of the digits of a call number, especially its characteristic portion, whereas the remaining digits are transmitted in some other manner to the selected junction.

We claim:

1. In a telecommunication system including a multiplicity of lines adapted to initiate outgoing calls to destinations identified by multidigit call numbers, said destinations being reachable through remote junctions served by a multiplicity of transmission paths and identified by a characteristic initial portion of a call number, a register engageable by a calling line to store at least said characteristic portion, switch means for temporarily connecting one of said transmission paths to a calling line, and a marker responsive to digits stored in said register for controlling said switch means, the improvement wherein said marker comprises:

first memory means connected to said register and provided with a first multiplicity of cells addressable by respective digits and digit combinations stored in said register upon the initiation of an outgoing call, each of said first cells containing a code word falling into one of several categories including a first category for complete identifications and a second category for incomplete identifications of selected junctions;

decoding means connected to said first memory means for receiving said code words therefrom and translating same into a variety of signals including identification signals on a first output in the case of code words in said first category and a request signal on a second output in the case of code words falling into said second category, said second output being connected to said register for calling forth a further digit in response to said request signal;

a control circuit for said switch means; and second memory means connected to said first output and provided with a second multiplicity of cells addressable by said identification signals to read out operating instructions for said control circuit.

2. The improvement defined in claim 1 wherein said categories include a third category for nonexisting junctions, said decoding means being provided with a third output emitting a busy signal in the case of code words falling into said third category.

3. The improvement defined in claim 1 wherein said second cells are divided into sets assigned to a group of transmission paths serving a respective junction, said control circuit including test means for ascertaining the availability of any transmission path in a selected group, further comprising sequencing means controlled by said test means and connected to said second memory means for normally directing an identification signal from said first output to a predetermined cell of a set assigned to a selected group, thereby instructing said control circuit to bring about the engagement of a corresponding transmission path by said switch means, and for transferring said identification signal to another cell of the same set upon unavailability of said corresponding transmission path.

4. The improvement defined in claim 1 wherein said first memory means is preprogrammed to emit a code word with a discriminating bit in a predetermined position for distinguishing between said first category and said second category, said decoding means including logical circuitry responsive to said discriminating bit for energizing one of said outputs.

5. The improvement defined in claim 4 wherein said logical circuitry includes a plurality of input leads, one for each bit of a code word, and gate means inserted between said input leads and said outputs for energizing one of said outputs in the presence of said discriminating bit and of at least one further bit and for energizing the other of said outputs in the absence of said discriminating bit and in the presence of at least one further bit.

6. The improvement defined in claim 5 wherein said first memory means is preprogrammed to emit a code word consisting only of said discriminating bit in response to digits and digit combinations, received from said register, which do not form part of a characteristic portion identifying an existing junction served any of said transmission paths, said decoding means being provided with a third output energizable by said gate means in the presence of said discriminating bit and in the absence of any further bit.

7. The improvement defined in claim 1, further comprising translating means inserted between said register and said first memory means for converting the stored digits into addresses of said first cells, said translating means including third memory means connected to said second output and to said first memory means for receiving the code words thereof, fed to said decoding means, in the presence of said request signal and storing each received code word for retransmission to said first memory means, together with the next digit called forth from said register, as a new address of one of said first cells.

8. The improvement defined in claim 7 wherein said translating means further comprises adding means connected to said third memory means and to said register for generating said new address as the sum of the numerical values of said next digit and said received code word.

\* \* \* \* \*